United States Patent [19]
Byrne

[11] Patent Number: 4,768,125
[45] Date of Patent: Aug. 30, 1988

[54] PROTECTIVE DEVICE FOR AN ELECTRIC MOTOR

[76] Inventor: Timothy K. Byrne, 15 N. Huffman St., Naperville, Ill. 60540

[21] Appl. No.: 122,527

[22] Filed: Nov. 18, 1987

Related U.S. Application Data

[63] Continuation of Ser. No. 945,227, Dec. 23, 1986, abandoned, which is a continuation of Ser. No. 691,143, Jan. 14, 1985, abandoned.

[51] Int. Cl.$^4$ ............................................. H02H 7/09
[52] U.S. Cl. ...................................... 361/33; 361/58; 361/91
[58] Field of Search .................. 361/23, 33, 58, 91, 361/111, 117, 118; 318/231, 434

[56] References Cited

U.S. PATENT DOCUMENTS

| | | | |
|---|---|---|---|
| 991,787 | 5/1911 | Kouwenhover et al. | 361/23 |
| 3,894,274 | 7/1975 | Rosenberry, Jr. | 361/23 |
| 4,041,543 | 8/1977 | Pasculle et al. | 361/33 |
| 4,178,617 | 12/1979 | Reichel | 361/23 X |
| 4,340,853 | 7/1982 | Braun et al. | 361/33 X |

Primary Examiner—A. D. Pellinen
Assistant Examiner—Derek S. Jennings
Attorney, Agent, or Firm—James A. Hudak

[57] ABSTRACT

A device for protecting a DC series electric motor from the voltage surge which occurs when the motor fields collapse. Electrical resistances are connected in parallel with the series field coils and the commutating field coils of the motor. The resistances safely absorb any voltage surge resulting from field collapse and also protect the motor from externally generated voltage spikes.

1 Claim, 1 Drawing Sheet

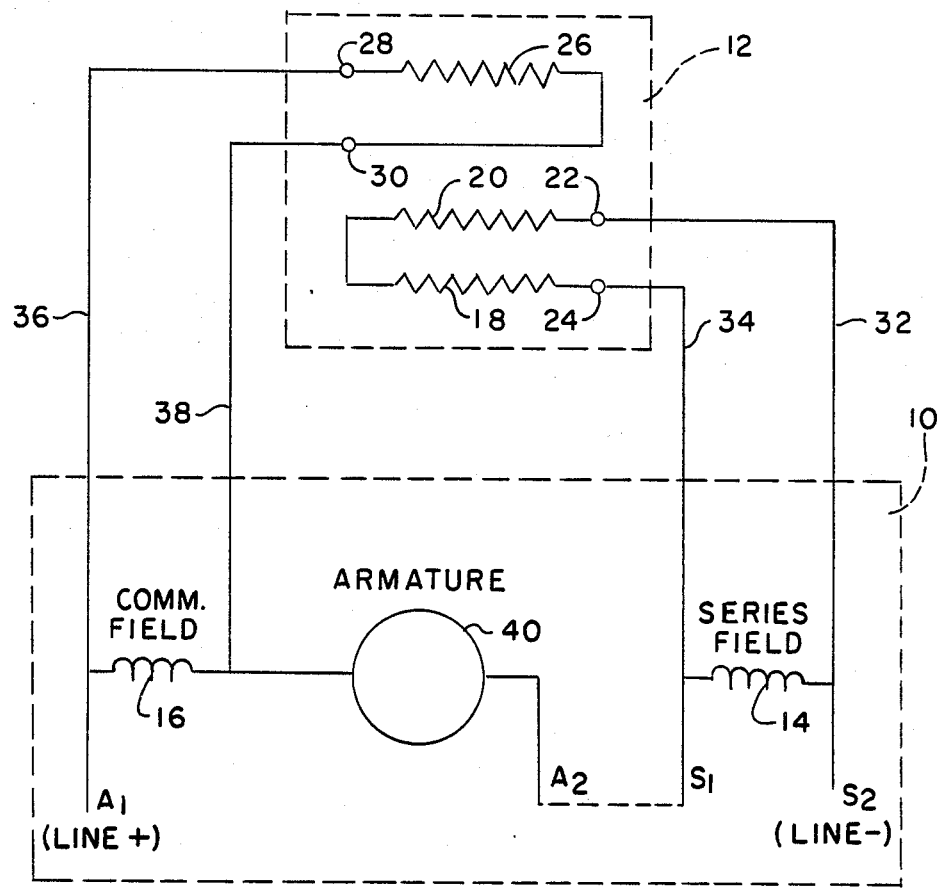

PROTECTIVE DEVICE FOR AN ELECTRIC MOTOR

This is a continuation of co-pending application Ser. No. 945,227, filed on Dec. 23, 1986, now abandoned, which is a continuation of co-pending application Ser. No. 691,143, filed on Jan. 14, 1985, now abandoned.

TECHNICAL FIELD

The present invention relates to a device for protecting an electric motor from voltage surges, and more of a DC series electric motor from the voltage surge which occurs when the motor fields collapse.

BACKGROUND ART

As is well-known, in a series electric motor, the armature and the field coils are connected in series. In addition, commutating field coils (interpoles), which are connected in series with the armature and the series field coils are sometimes utilized to neutralize the reactive voltage induced in the armature when undergoing commutation. In this manner, brush sparking is minimized. However, if the commutating field and the series field suddenly collapse due to a power failure, the self-inductance of the commutating and the series field coils produces a very large voltage surge which must be dissipated by the motor insulation. This voltage surge may cause arcing from the brush holder to the commutator or to the motor frame, and commutator flashover. The end result is that the motor insulation will be weakened, the commutator might be damaged by the flashover, and an unsafe condition might be created by the arcing.

The foregoing problems have been minimized in shunt motors by the use of a shunt field coil discharge resistor, however, such resistors are typically placed within the motor controller rather than within the motor. The purpose of such resistors is to protect the controller from contactor arcing rather than to protect the motor, and thus provide no protection for the motor insulation, the commutator, and the brush holders.

Because of the foregoing, it has become desirable to develop a device for protecting the components of a DC series motor from the voltage surge which occurs as a result of the collapse of the motor fields.

SUMMARY OF THE INVENTION

The present invention solves the aforementioned problems associated with the prior art as well as other problems series field and the commutating field. Each of these resistors is connected in parallel with its associated field coils. Thus, the resistors are part of the motor and protect same, rather than being part of the motor controller. The resistors are selected so that the voltages induced therein, as a result of a collapse of the fields, remain at a safe level, thus minimizing any weakening of the motor insulation, brush arcing, and flashover.

BRIEF DESCRIPTION OF THE DRAWING

The single figure of the drawing is a schematic diagram of the apparatus of the invention and its connection to a DC series motor.

DESCRIPTION OF THE PREFERRED EMBODIMENT

Referring now to the drawing where the illustration is for the purpose of describing the preferred embodiment of the present invention and is not intended to limit the invention hereto, the figure is a schematic diagram of a DC series motor, shown generally by the numeral 10, with a resistance unit, shown generally by the numeral 12, connected across series field coils 14 and its commutating field coils 16 of the motor. The resistance unit 12 is comprised of a series combination of resistors 18 and 20 connected to the output terminals 22, 24 of the unit, and a resistor 26 connected to the output terminals 28, 30 of the unit. The output terminals 22, 24 of the resistance unit 12 are connected by leads 32, 34 across the series field coils 14 of the motor 10 resulting in the combination of the resistors 18, 20 being in parallel with the series field coils 14. Similarly, the output terminals 28, 30 of the resistance unit 12 are connected by leads 36, 38 across the commutating field coils 16 of the motor 10 resulting in the resistor 26 being in parallel with the commutating field coils 16. It should be noted that it may be desirable to install individual resistors across each series field coil and across each commutating field coil. Such an approach minimizes lead inductance and also accomplishes the objective of protecting the motor from the voltage surge which occurs when the motor fields collapse. Thus, regardless of whether individual resistors are placed across each field coil or across the combination of the series field coils and across the combination of the commutating field coils, the motor is protected from the foregoing voltage surge. With either approach, the series field coils 14 are provided with terminal leads $S_1$ and $S_2$ which are brought out to a connection box (not shown) for connection purposes. Similarly, the series combination of the commutating field coils 16 and the armature 40 is provided with terminal leads $A_1$ and $A_2$ which are brought out to the connection box for connection purpose. It should be noted that the foregoing terminal lead identification system is standard throughout the electrical motor industry. The terminal leads $A_2$ and $S_1$ are interconnected within the connection box and the leads $A_1$ and $S_2$ are connected to the DC power source (not shown).

The resistors 18, 20 and 26 are wire-wound power resistors having a multiple layer concentric winding construction. As such, each resistor has a resistance of approximately 1 ohm and an inductance of less than 1 microhenry. If individual resistors are installed across each series field coil and across each commutating field coil, the resistance and inductance of each resistor is commensurately less. Because of this low resistance and inductance, when a power interruption occurs causing the series field and the commutating field to collapse, the voltage induced in the resistors 18, 20 and 26 is quite low. For example, if the current flowing through the series field coils 14 and the commutating field coils 16 was 400 amps before these fields collapsed, the voltage induced in the resistors 18, 20 and 26 would be approximately 400 volts, which is a safe level. In contrast, if the resistors 18, 20 and 26 were not present, the only resistance available to absorb the induced voltage is the resistance provided by the motor insulation. Assuming such insulation resistance to be approximately 5 megohms, the motor insulation would be subjected to a $2 \times 10^9$ volts surge (theoretical) at the time the foregoing fields collapsed. The actual voltage surge would be substantially lower due to arcing, insulation breakdown, and the like, however, it would still be sufficiently large to weaken the motor insulation and/or initiate an arc in the motor which could lead to commutator flashover and ultimate motor failure.

In addition to providing a means for absorbing the voltage surge which occurs when the motor fields collapse, the resistance unit 12 also protects the motor from externally generated voltage spikes. Since the resistors 18, 20 and 26 have a very low resistance and inductance, their resulting impedance is substantially less than the impedance of the series field coils 14 and the commutating field coils 16. Because of this substantial difference in impedance, the voltage spike passes through and is absorbed by the resistors 18, 20 and 26, effectively bypassing the series field coils 14 and the commutating field coils 16. In this manner, the field coils 14, 16 are also effectively protected from externally generated voltage spikes.

The values of the resistors 18, 20 and 26 and the power ratings for same are determined by the magnitude of the current levels involved, and are sized so as to limit the induced voltage to a safe level and to absorb most (in excess of 90%) of the energy released by the series and commutating fields upon collapse. In addition, the values of the resistors 18, 20 and 26 are selected such that the resistors have no measurable effect on the performance or operating characteristics of the motor 10 during normal operation thereof. Thus, the operating characteristics of the motor are unaffected by the use of the resistance unit 12, however, the resistance unit 12 is available to protect the motor from the voltage surge which occurs when the fields collapse and from externally generated voltage spikes.

Certain modifications and improvements will occur to those skilled in the art upon reading the foregoing, it should be understood that all such modifications and improvements have been deleted herein for the sake of conciseness and readability, but are properly within the scope of the following claims.

I claim:

1. A device for protecting a D.C. series motor when the series field winding and the commutating field winding therein collapse comprising first resistance means and second resistance means for dissipating the voltage surge produced by the series field winding and the commutating field winding upon the collapse thereof, said first resistance and second resistance means each having a fixed resistance value, said first resistance and second resistance means for connecting in parallel with the series field winding and the commutating field winding, respectively.

* * * * *